(12) United States Patent
Hertling et al.

(10) Patent No.: US 7,016,962 B2
(45) Date of Patent: Mar. 21, 2006

(54) SYSTEM AND METHOD FOR CREATING A USER INTERFACE BETWEEN AN APPLICATIONS AND NETWORK SERVICES

(75) Inventors: William E. Hertling, Portland, OR (US); Petar Obradovic, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 914 days.

(21) Appl. No.: 09/943,717

(22) Filed: Aug. 31, 2001

(65) Prior Publication Data

US 2003/0065783 A1   Apr. 3, 2003

(51) Int. Cl.
G06F 15/16   (2006.01)

(52) U.S. Cl. .................... 709/227; 709/201; 709/202; 709/203; 709/230; 709/217; 715/705; 715/733; 715/744; 715/810

(58) Field of Classification Search ............... 709/227, 709/217, 202, 203, 230, 213, 201; 715/705, 715/733, 744, 810
See application file for complete search history.

(56) References Cited

U.S. PATENT DOCUMENTS

| 6,139,177 A | 10/2000 | Venkatraman et al. ...... 364/188 |
| 6,539,422 B1 * | 3/2003 | Hunt et al. .................. 709/217 |
| 6,718,371 B1 * | 4/2004 | Lowry et al. ................ 709/213 |

OTHER PUBLICATIONS

"Dynamic User Interface is Only Skin Deep", www.javaworld.com, http://www.javaworld.com/javaworld/jw-05-2000/jw-0518-skins—p.html.*
"Importing XML Maps, XML Lists, and Dynamic Chart Sources in Excel 2003", http://64.233.161.104/search?q=cache:ECaFwltqYigJ:msdn.microsoft.com/library/en-us/odc_xl2003_ta/html/odc_XMLLists.asp+dynamic+user+interface+xml&hl+en.*

* cited by examiner

*Primary Examiner*—Jeffrey Pwu

(57) ABSTRACT

In order to assure that services in an network and applications or users in the network are able to communicate and interact with one another data is provided by the specification and the application that provides for an operable interface between the application and the service. A user or user system can make use of the data information provided by the service to perform selected functions and tasks that is conveyed to the application and passed on to the service. Various graphical user interfaces can be provided, depending on the application and the need of the user.

50 Claims, 8 Drawing Sheets

SYSTEM AND METHOD FOR CREATING A USER INTERFACE BETWEEN AN APPLICATIONS AND NETWORK SERVICES

BACKGROUND OF THE INVENTION

1. Field of the Invention

This invention relates to the field of network applications such as applications on the Internet, in particular to a method and system to allow users to interface to various network services without a strict service directed user interface.

2. Description of the Related Art

The world wide web (WWW), specifically through web applications has allowed for numerous services to be provided. Services include photo sharing web sites, researching databases, accessing public library catalog, and electronic commerce (e-commerce). Web site services continue to evolve to allow greater interaction between users, providers of services and products, and web sites that allow groups to communicate. E-commerce has grown from consumers merely visiting a commercial web-site and ordering goods or services by entering account and or credit card information to interactive communication between consumers and websites. Service frameworks provide for interaction between groups in a network or the Internet. Service frameworks allow the Internet to evolve from a collection of web-sites accessed by a personal computer to a network of interconnected services that work together to solve problems, perform tasks, or meet a need. Systems and services will be able to have intelligent communications with or without the need for user intervention. Service frameworks include E-speak™ developed by the Hewlett Packard Corporation and Enterprise Java Beans™ (EJB) developed by Sun Microsystems, Inc.

Service frameworks define a uniform services interface or application programming interfaces (API), and uniform services interaction such as the E-speak™ engine allow services to dynamically interact to discover, negotiate, broker and compose themselves to solve a business to business, or business to consumer service request. Most service interfaces are defined by an extensible mark-up language (XML) scheme or an XML interface.

Application programs (applications) that once controlled various functions and routines were made up of large pervasive sections of code, where one user interface could suffice. Applications are now seen as a collection of individual standalone services that are distributed over a network such as the Internet and combined together by a web application to form a useful end user service. This allows for code reuse, greater flexibility, and ease of maintenance. Individual applications, however, may or may not have proper user interfaces that allow a user to communicate to services.

When separate pieces of software desire to interact with one other, an interface between the pieces of software must be provided. The interface can have many different characteristics. Characteristics can include tightness of coupling; language independence; and communication mechanism. Relatively tightly coupled interfaces require a change whenever a change is made to one of the pieces of software. Language independence relates to the need for the same language to be used for the interface as the language used for the pieces of software. Certain languages provide for independent or different languages for the interface and the pieces of software. Communication mechanism relates to the ability of an interface to allow pieces of software to call one another in the same memory space or communication network.

In typical systems, a service tends to be a collection of software that has interfaces that are loosely coupled, language independent, and Internet-communication capable. A component tends to have a tightly coupled, language dependent interface. A component tends to be part of an application, while a service tends to stand apart from the application.

Ideally, an application provides a user interface that is uniform in graphics, behavior, look, and feel. Because a service is typically reused by many different applications, is not desirable to have a service provide parts of the user interface, since the service can provide a user interface having different graphics, behavior, look, and feel.

Service frameworks typically provide an application programming interface model that does not allow individual services to provide user interfaces to the user, or otherwise directly interact with the user. Problems therefore can arise with the basic need to provide an interface between services and users.

A need has been felt for a method and a system, in particular a service framework that allows services that do not have a user interface (UI) to communicate with a user through an appropriate UI. The service framework should be easy to use, extensible, and allow service developers to provide user interaction to their services.

SUMMARY OF THE INVENTION

The aforementioned and other features are accomplished, by providing a method and system in which an application and service exchange data files, and additional interface information is provided allowing interface information to be presented to a user system.

In certain embodiments of the invention, a service provides a dynamic user interface specification that is usable by the application and the user. A user system through the application is able to provide a user interface response back to the service, requesting specific actions or functions to be performed by the service.

Various interfaces can be provided to the user, with some embodiments of the invention using a browser type of graphical user interfaces. Data files related to the interface specification and user response can be written in extensible markup languages and other similar languages.

BRIEF DESCRIPTION OF THE DRAWINGS

The present invention may be better understood, and it's numerous objects, features and advantages made apparent to those skilled in the art by referencing the accompanying drawings. The use of the same reference number throughout the figures designates a like or similar element.

Figure 1:
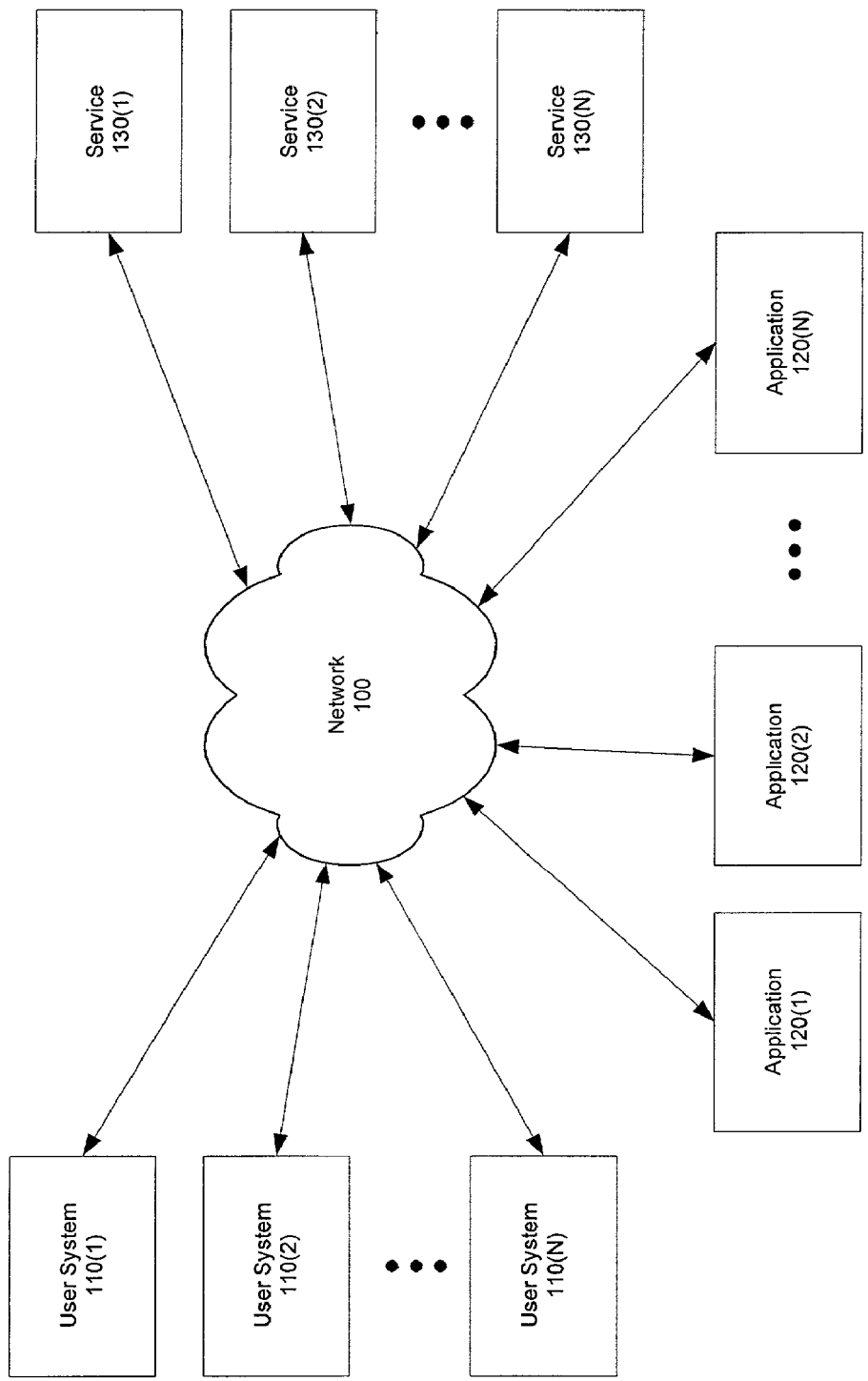
FIG. 1 is a block diagram illustrating a network of user systems, applications, and services.

While the invention is susceptible to various modifications and alternative forms, specific embodiments thereof are shown by way of example in the drawings and will herein be described in detail, it should be understood, however, that the drawings and detailed description thereto are not intended to limit the invention to the particular form disclosed but on the contrary, the intention is to cover all modifications, equivalents, and alternatives falling within the scope of the present invention as defined by the appended claims.

DETAILED DESCRIPTION

FIG. 1 is a block diagram illustrating a network of user systems, applications, and services. A network 100 connects a multiple number of user systems, applications and services. In this particular example, a user system 110 (1), user system 110 (2), and up to and including a user system 110 (N) are included as part of the network system. Network 100 in this particular example is the Internet; however, other networks including local area networks of wide area networks, WLAN, and other similar type networks can be used. Computer network applications are connected to the network 100. In this example, the applications include application 120 (1), application 120 (2), and up to and including user system application 120 (N). Additionally, services are part of the network. In this example, service 130 (1), service 130 (2), and up to and including services 130 (N) are included. User systems, in particular operators who interface into a particular user system, with a desire to interface with a service will go through an application. The application in turn will communicate to the service. User systems can connect through the network 100 to communicate to the application. However, it is also expected that a user system can go through a separate network or be directly connected to an application. Likewise various applications, services, systems can be connected indirectly or directly through a network or different networks and connections.

Figure 2:
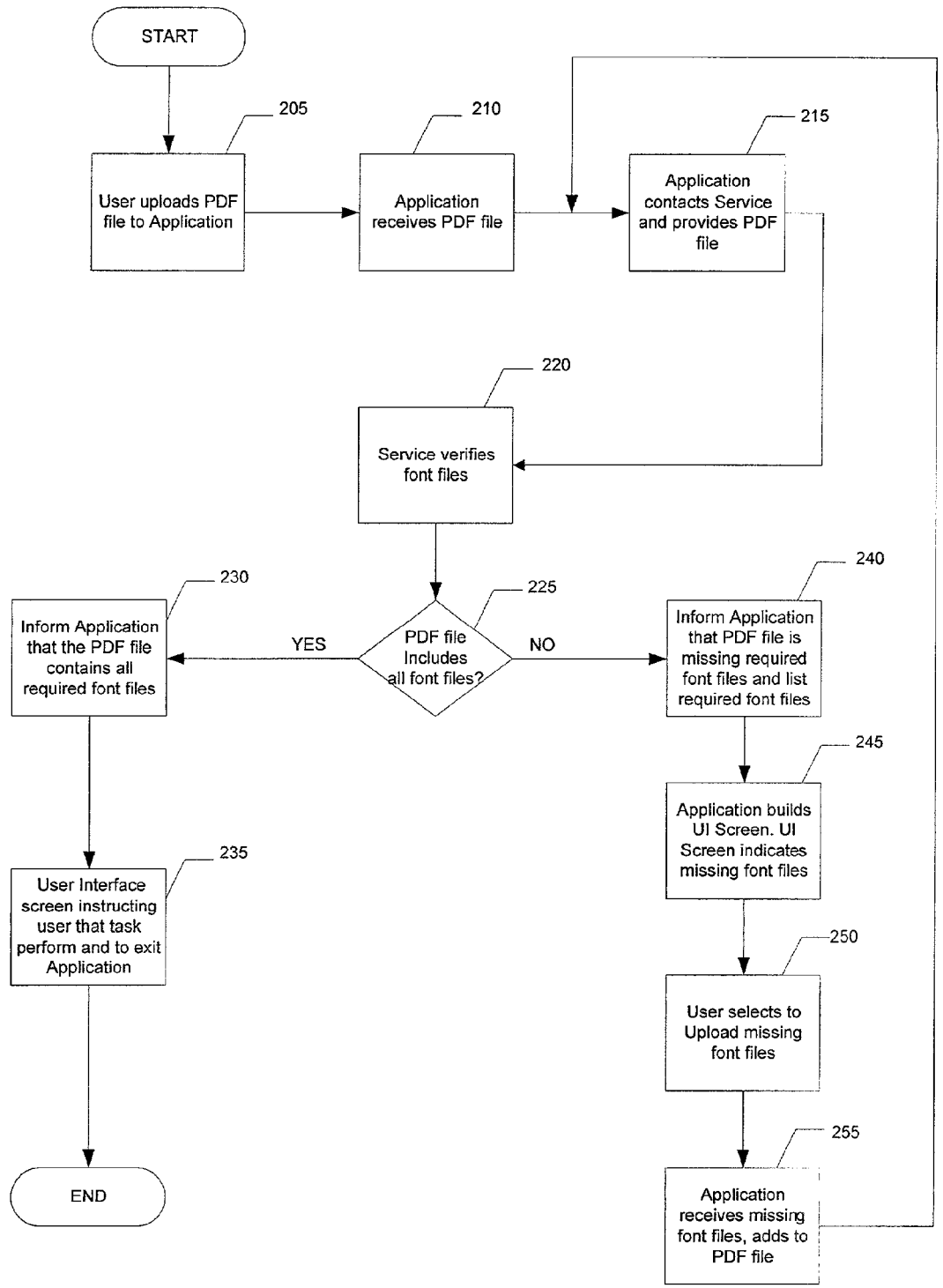
FIG. 2 is a flow chart illustrating a process between a user service, and an application involving missing font files.

FIG. 2 is a flow chart illustrating a process between a user service, and an application involving missing font files. In this particular example, illustrated is an application of an on-line Internet print job submittal. The service determines problems with a print job. The function served by the service is to take a document, in specific a PDF format file, and verify that the fonts of the document are included in the PDF format file. The user uploads a particular PDF file to the application, step 205. The application, in turn, receives the PDF file, step 210. The application contacts a particular service and provides the service with the PDF file, step 215. The service verifies that the particular PDF file has all the correct and necessary font files, step 220. A determination is made in regards to whether the PDF file includes all the font files, step 225. If the particular PDF file has all the necessary and required font files, the application is informed, step 230. A user interface screen instructs the user that the task has been performed and asks the user to exit the application, step 235. If required font files are not included in the PDF file, the service informs the application the PDF file or files are missing and lists the particular required missing font files, step 240. The application builds a user interface screen with, the user interface screen indicating the missing font files, step 245. User is instructed to select to upload the missing font files, step 250. The application receives the missing font files and adds them to the existing PDF file, step 255. The process goes back to step 215 and continues process from there.

Figure 3:
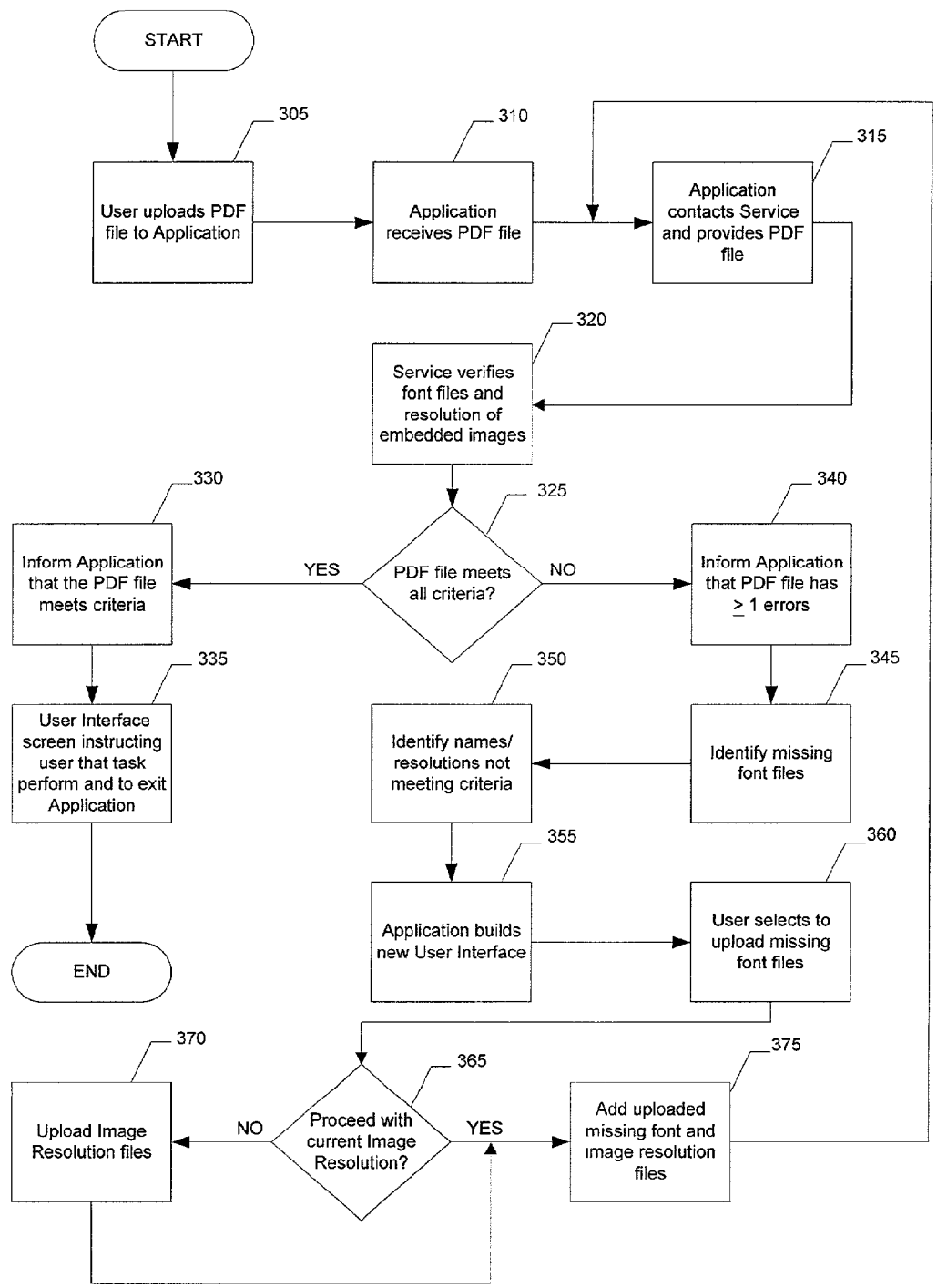
FIG. 3 is a flow chart illustrating a process between a user system, an application, and a service involving missing font files and resolutions of images.

FIG. 3 is a flow chart illustrating a process between a user system, an application, and a service involving missing font files and resolutions of images. The process illustrated in FIG. 3 is slightly more complicated than the process illustrated in FIG. 2. In addition to verifying files, a verification is also made as to the resolution of embedded images. Complexity is added to the creation of a user interface screen reviewed to the user system. The process begins with having a user uploading the PDF file to the application, step 305. The application receives the PDF file, step 310. The application contacts the service and provides the PDF file to the service, step 315. The service verifies both that required font files exist and correct resolution of embedded images, step 320. A determination is made that the PDF file meets all criteria, step 325. If all criteria are met, including required font files in resolution, the application is informed that the PDF file meets all the criteria, step 330. A user interface screen is provided to the user instructing the user that the task has been performed and requests the user to exit the application, step 335. If the PDF file does not meet all the criteria, the application is informed that the PDF file has one or more errors, step 340. The missing font files can be identified, step 345. The names or resolution files that do not meet the criteria can also be identified, step 250. The application builds a new user interface, step 355. The user selects to upload missing font files, step 360. The user is given the option on whether to proceed with the current image resolution, if the current image resolution is satisfactory to the user, step 365. If the user decides to correct the image resolution, the user uploads the image resolution files, step 370. The user decides to proceed with the current image resolution. The process proceeds by uploading any missing font files, step 375, and if image resolution files have been uploaded, step 375 is conducted. After step 375 the application goes back to step 315, and the process continues.

Figure 4:
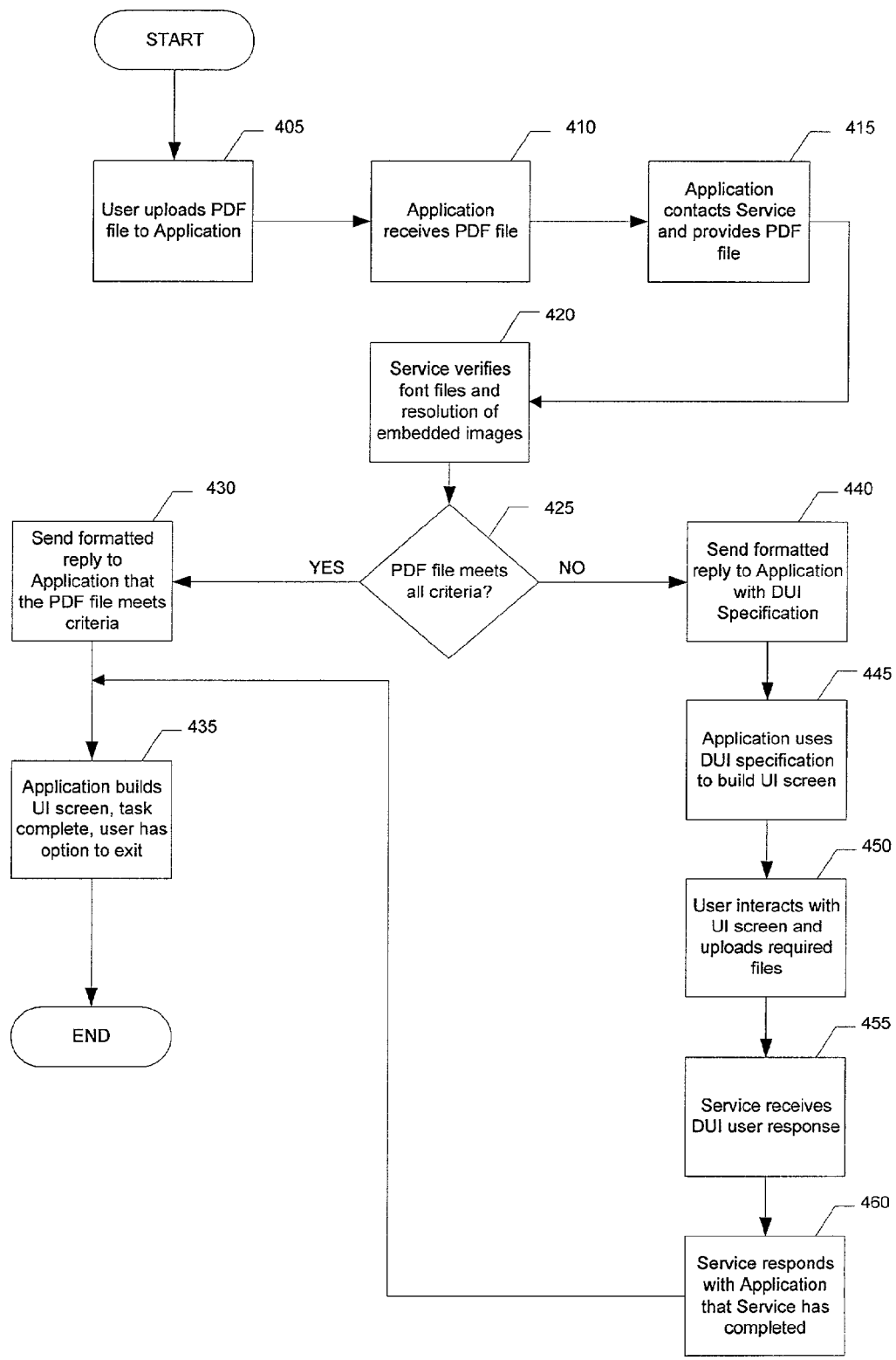
FIG. 4 is a flow chart illustrating a process between a user, a specification, and an application using a DUI specification and DUI response.

FIG. 4 is a flow chart illustrating a process between a user, a specification, and an application using a DUI specification and DUI response. The user uploads the PDF file to the application, step 405. The application receives the PDF file, step 410. The application contacts the service and provides the PDF file, step 415. The service verifies that all the font files and resolution images are present, step 420. If the PDF file meets all criteria, a formatted reply to the application is provided stating that the PDF file meets all criteria, step 430. The application then builds a user interface screen indicating that the task is complete and that the user has the option to exit the application, step 435. If the PDF file fails in meeting any of the criteria, the formatted reply to the application is sent by the service with a dynamic user interface (DUI) specification. This particular DUI specification is a simple UI term containing an explanatory error message indicating the problem is missing fonts, and/or has improper resolution images. Included in the DUI specification can be a list of UI items defining each item, for example, item text, font name, plus an indication whether items are missing or existing. Also, an action that can be required in regards to the list of UI items. The DUI specification can also include a list of UI items, describing the item and the text associated with a particular resolution criteria. The DUI specification can also include information in regards to an action that can be taken per each item on the item list, in particular, upload the image or to proceed regardless of the resolution. The application then proceeds to use the DUI specification to build a user interface screen, step 445. The user is presented the ability to interact with the user interface screen, in particular, the user is given an option to upload required files, step 450. The service receives a DUI user response, 460.

The service responds with the application that the service has completed its function, step 465. The process then proceeds to step 435.

The following is an example DUI specification. The example DUI specification is written in XML, however, other languages can be used.

```
<dui-specification id="34">
    <warning>Problems encountered during preflight analysis</warning>
    <maintext>We have checked your document "CatStory.doc" for possible printing problems.
We have identified three potential problems. Please review the problems carefully, then choose what to
do.</maintext>
        <group name="Font Problems">
    <item>
    <text>The document is uses the font "Century Gothic", but the font file is not included with the
documents.<text>
        <action type=upload id="35" required="true"/>
    </item>
        </group>
        <group name="Image Problems">
            <text>Each of the images below, which are part of your document, are low resolution
images, which may not print well. An image should be 600 dpi to print well.</text>
    <item>
    <text>"Xander.jpg": resolution = 300 dpi</text>
    <actionlist selectExactlyOne="true">
        <action type="upload" id="36" required="false"/>
        <action type="checkbox" id="37" required="false">Ignore and print anyway</action>
    </actionlist>
            <item>
    <item>
    <text>"Dar.jpg": resolution = 150 dpi</text>
    <actionlist selectExactlyOne="true">
        <action type="upload" id="38" required="false"/>
        <action type="checkbox" id="39" required="false">Ignore and print anyway</action>
    </actionlist>
            <item>
        </group>
    </dui-specification>
```

The user interface response from a browser is in an encoding particular to browser responses. The encoding is in particular a multi-part Multipurpose Internet Mail Extensions (MIME) encoding. MIME is a formatting specification that in particular provides for ASCII messages to be sent over the Internet. From a multi-part MIME encoding into an XML encoding of the DUI User Response. The conversion can be done through extensible style language transformation (XSLT). XSLT is a language that allows transformation of XML documents into other XML documents. Alternatively, the conversion can be performed programmatically in a language such as Java™. The conversion can be done by software that is not part of the application or the service. The conversion software can be a different application, a software component or utility, or another service. The conversion can be done in a standard way for all applications, or the conversion can be done in a custom way for a specific application.

The following is an example DUI user response. The example DUI user response is in XML, however, other languages can be used.

```
<dui-user-response id="134" responseTo="34">
    <action-response type=upload id="135" responseTo="35" bytes=
"65323" encoding="base64" file-name="CenturyGothic.ttf">
    kljrlgk4j4t45987fe8fd7hfdj0759f87mffdxkiuf5nlfd6u8f7fnof87fnsd8
    kljrlgk4j4t45987fe8fd7hfdj0759f87mffdxkiuf5nlfd6u8f7fnof87fnsd8
    kljrlgk4j4t45987fe8fd7hfdj0759f87mffdxkiuf5nlfd6u8f7fnof87fnsd8
    kljrlgk4j4t45987fe8fd7hfdj0759f87mffdxkiuf5nlfd6u8f7fnof87fnsd8
    kljrlgk4j4t45987fe8fd7hfdj0759f87mffdxkiuf5nlfd6u8f7fnof87fnsd8
    kljrlgk4j4t45987fe8fd7hfdj0759f87mffdxkiuf5nlfd6u8f7fnof87fnsd8
    ...
    kljrlgk4j4t45987fe8fd7hfdj0759f87mffdxkiuf5nlfd6u8f7fnof87fnsd8
    kljrlgk4j4t45987fe8fd7hfdj0759f87mffdxkiuf5nlfd6u8f7fnof87fnsd8
```

-continued

```
    kljrlgk4j4t45987fe8fd7hfdj0759f87mffdxkiuf5nlfd6u8f7fnof87fnsd8
    </action-response>
    <action-response type="upload" id="136" responseTo="36" bytes=
"125239" encoding="base64" file-name="Xander-original.jpg">
    kljrlgk4j4t45987fe8fd7hfdj0759f87mffdxkiuf5nlfd6u8f7fnof87fnsd8
    kljrlgk4j4t45987fe8fd7hfdj0759f87mffdxkiuf5nlfd6u8f7fnof87fnsd8
    kljrlgk4j4t45987fe8fd7hfdj0759f87mffdxkiuf5nlfd6u8f7fnof87fnsd8
    kljrlgk4j4t45987fe8fd7hfdj0759f87mffdxkiuf5nlfd6u8f7fnof87fnsd8
    kljrlgk4j4t45987fe8fd7hfdj0759f87mffdxkiuf5nlfd6u8f7fnof87fnsd8
    kljrlgk4j4t45987fe8fd7hfdj0759f87mffdxkiuf5nlfd6u8f7fnof87fnsd8
    ...
    kljrlgk4j4t45987fe8fd7hfdj0759f87mffdxkiuf5nlfd6u8f7fnof87fnsd8
    kljrlgk4j4t45987fe8fd7hfdj0759f87mffdxkiuf5nlfd6u8f7fnof87fnsd8
    kljrlgk4j4t45987fe8fd7hfdj0759f87mffdxkiuf5nlfd6u8f7fnof87fnsd8
    </action-response>
    <action-response type="checkbox" id="139" responseTo=
"39" checked="True"/>
    </dui-specification>
```

Figure 5:
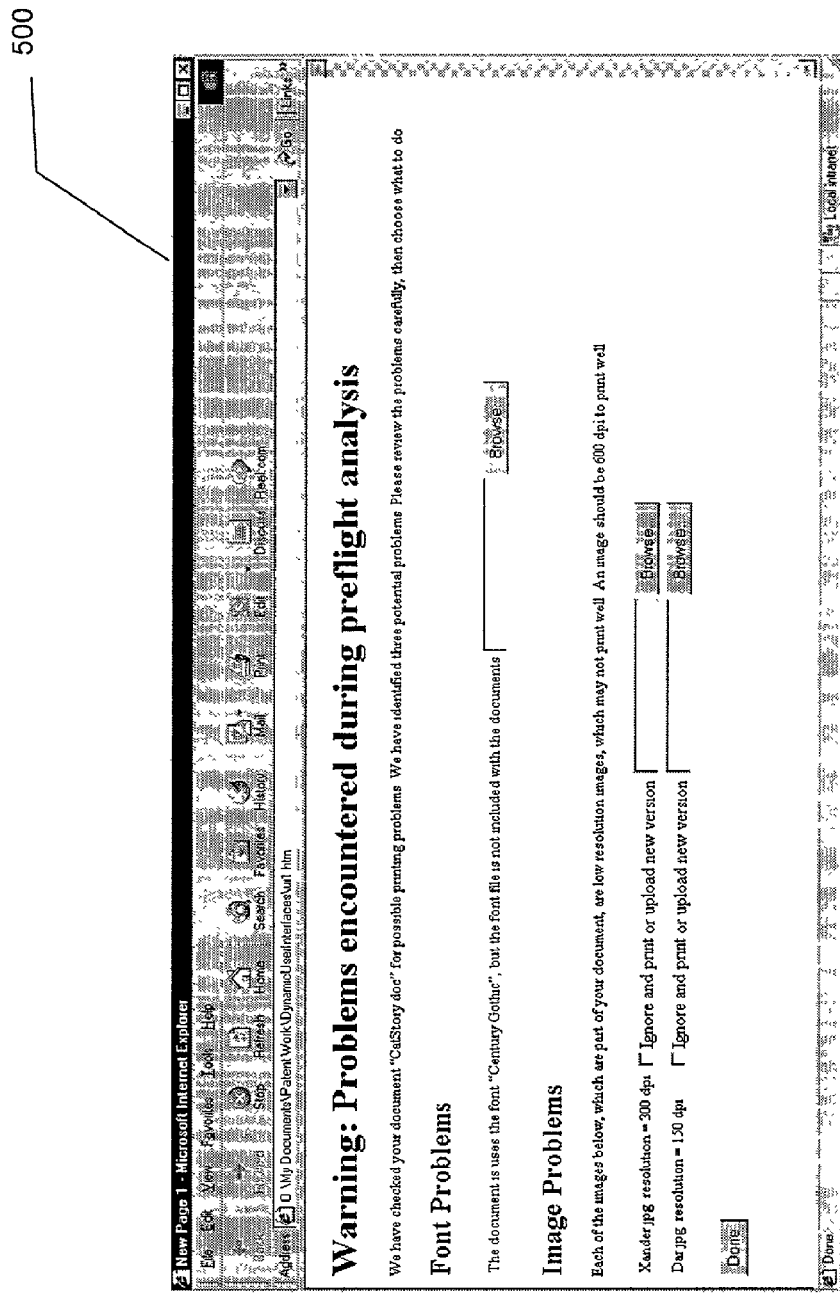
FIG. 5 is an example of a user interface screen.

FIG. 5 illustrates an example graphical user interface. Graphical user interfaces (GUI) can be presented in various formats including hyper text markup language (HTML), Windows® by the Microsoft Corp., and wireless markup language (WML). Typically, all GUI share certain logical user interface concepts, such as a yes/no dialog, a selection of a single item from a list, selection of multiple items from a list, entering text, and so forth. When services use the DUI interface specification, services can focus on the information to be displayed and the information to be gathered from the user. In other words, services do not need to be concerned with the details of how to display or format information for the user.

An application having a user interface can convert the DUI Specification into the correct representation for a target user interface mechanism. The target user interface mechanism can be a web browser based on HTML; a cellular phone browser based on wireless application protocol (WAP) using WML; or a client based browser using Windows®.

An Example Computing and Network Environment

Figure 6:
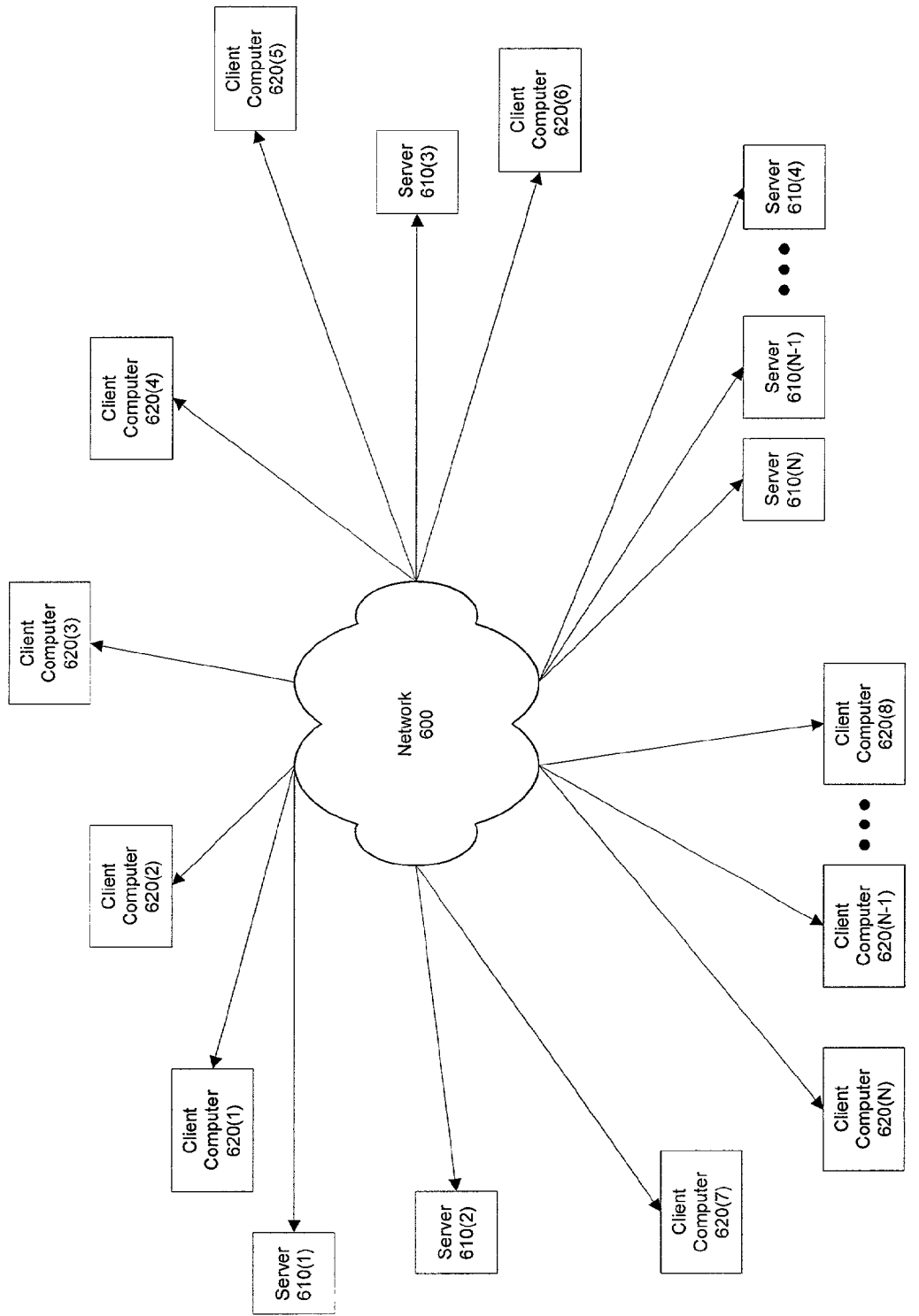
FIG. 6 is a block diagram illustrating a network environment in which commercial transaction processing according to embodiments of the present invention may be practiced.

FIG. 6 is a block diagram illustrating a network environment in which a system according to the present invention may be practiced. As is illustrated in FIG. 6, network 600, such as a private wide area network (WAN) or the Internet, includes a number of networked servers 610(1)–(N) that are accessible by client computers 620(1)–(N). Communication between client computers 620(1)–(N) and servers 610(1)–(N) typically occurs over a publicly accessible network, such as a public switched telephone network (PSTN), a DSL connection, a cable modem connection or large bandwidth trunks (e.g., communications channels providing T1 or OC3 service). Client computers 620(1)–(N) access servers 610(1)–(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of client computers 620(1)–(N).

One or more of client computers 620(1)–(N) and/or one or more of servers 610(1)–(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client computers 620(1)–(N) is shown in detail in FIG. 6.

Figure 7:
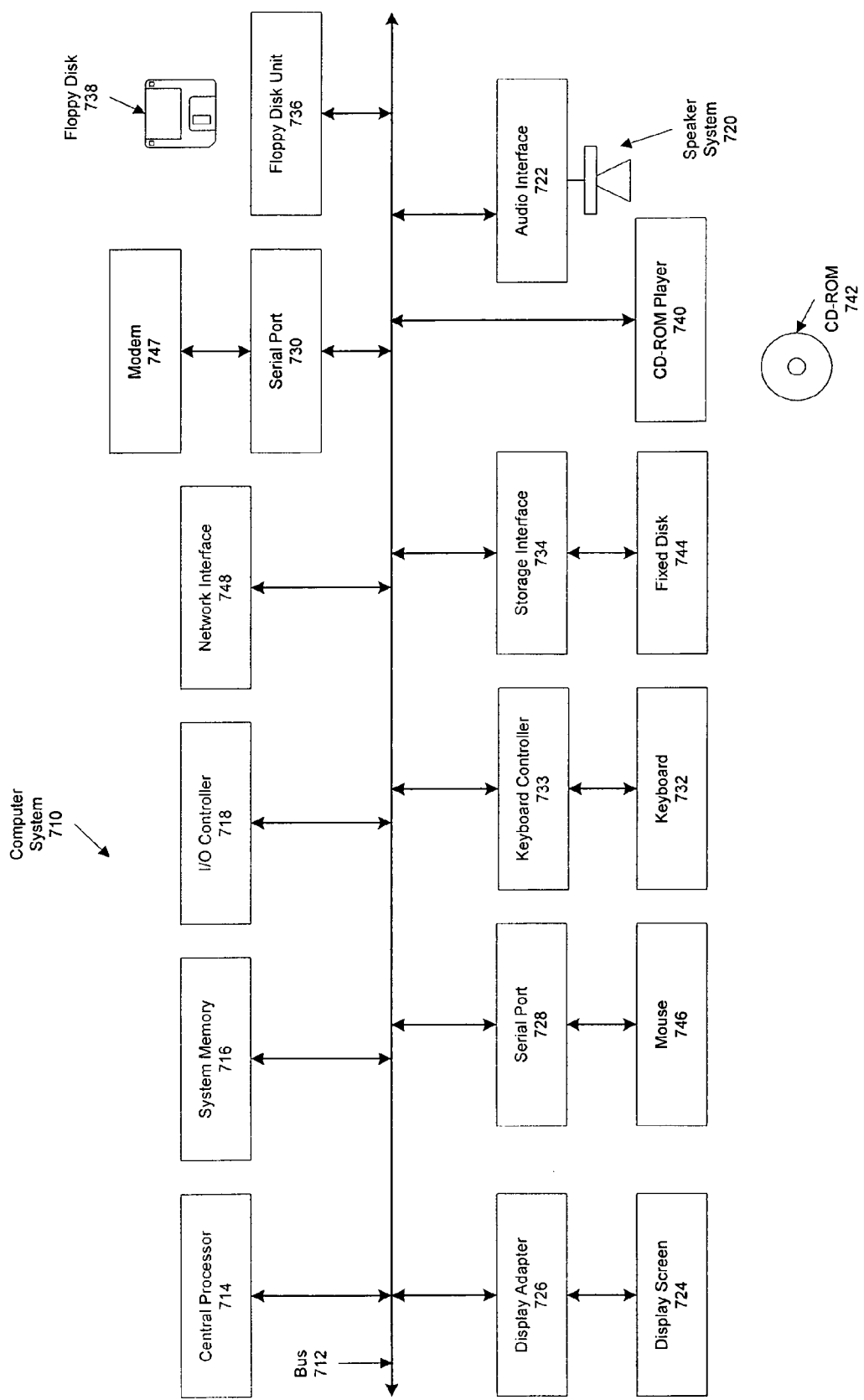
FIG. 7 is a block diagram illustrating a computer system suitable for implementing embodiments of the present invention.

FIG. 7 depicts a block diagram of a computer system 710 suitable for implementing the present invention, and example of one or more of client computers 620(1)–(N). Computer system 710 includes a bus 712 which interconnects major subsystems of computer system 710 such as a central processor 714, a system memory 716 (typically RAM, but which may also include ROM, flash RAM, or the like), an input/output controller 718 an external audio device such as a speaker system 720 via an audio output interface 722, an external device such as a display screen 724 via display adapter 726, serial ports 728 and 730, a keyboard 732 (interfaced with a keyboard controller 733), a storage interface 734, a floppy disk drive 736 operative to receive a floppy disk 738, and a CD-ROM drive 740 operative to receive a CD-ROM 742. Also included are a mouse 746 (or other point-and-click device, coupled to bus 712 via serial port 728), a modem 747 (coupled to bus 712 via serial port 730) and a network interface 748 (coupled directly to bus 712).

Bus 712 allows data communication between central processor 714 and system memory 716, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 710 are generally stored on and accessed via a computer readable medium, such as a hard disk drive (e.g., fixed disk 744), an optical drive (e.g., CD-ROM drive 740), floppy disk unit 736 or other storage medium. Additionally, applications may be in the form of electronic signals modulated in accordance with the application and data communication technology when accessed via network modem 747 or interface 748.

Storage interface 734, as with the other storage interfaces of computer system 710, may connect to a standard computer readable medium for storage and/or retrieval of information, such as a fixed disk drive 744. Fixed disk drive 744 may be a part of computer system 710 or may be separate and accessed through other interface systems. Many other devices can be connected such as a mouse 746 connected to bus 712 via serial port 728, a modem 747 connected to bus 712 via serial port 730 and a network interface 748 connected directly to bus 712. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 7 to be present to practice the present invention. The devices and subsystems may be interconnected in different ways from that shown in FIG. 7. The operation of a computer system such as that shown in FIG. 7 is readily known in the art and is not discussed in detail in this application. Code to implement the present invention may be stored in computer-readable storage media such as one or more of system memory 716, fixed disk 744, CD-ROM 742, or floppy disk 738. Additionally, computer system 710 may be any kind of computing device, and so includes personal data assistants (PDAs), network appliance, X-window terminal or other such computing device. The operating system provided on computer system 710 may be MS-DOS®, MS-WINDOWS®, OS/2®, UNIX®, Linux® or other known operating system. Computer system 710 also supports a number of Internet access tools, including, for example, an HTTP-compliant web browser having a JavaScript interpreter, such as Netscape Navigator® 8.0, Microsoft Explorer® 8.0 and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 710). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 8:
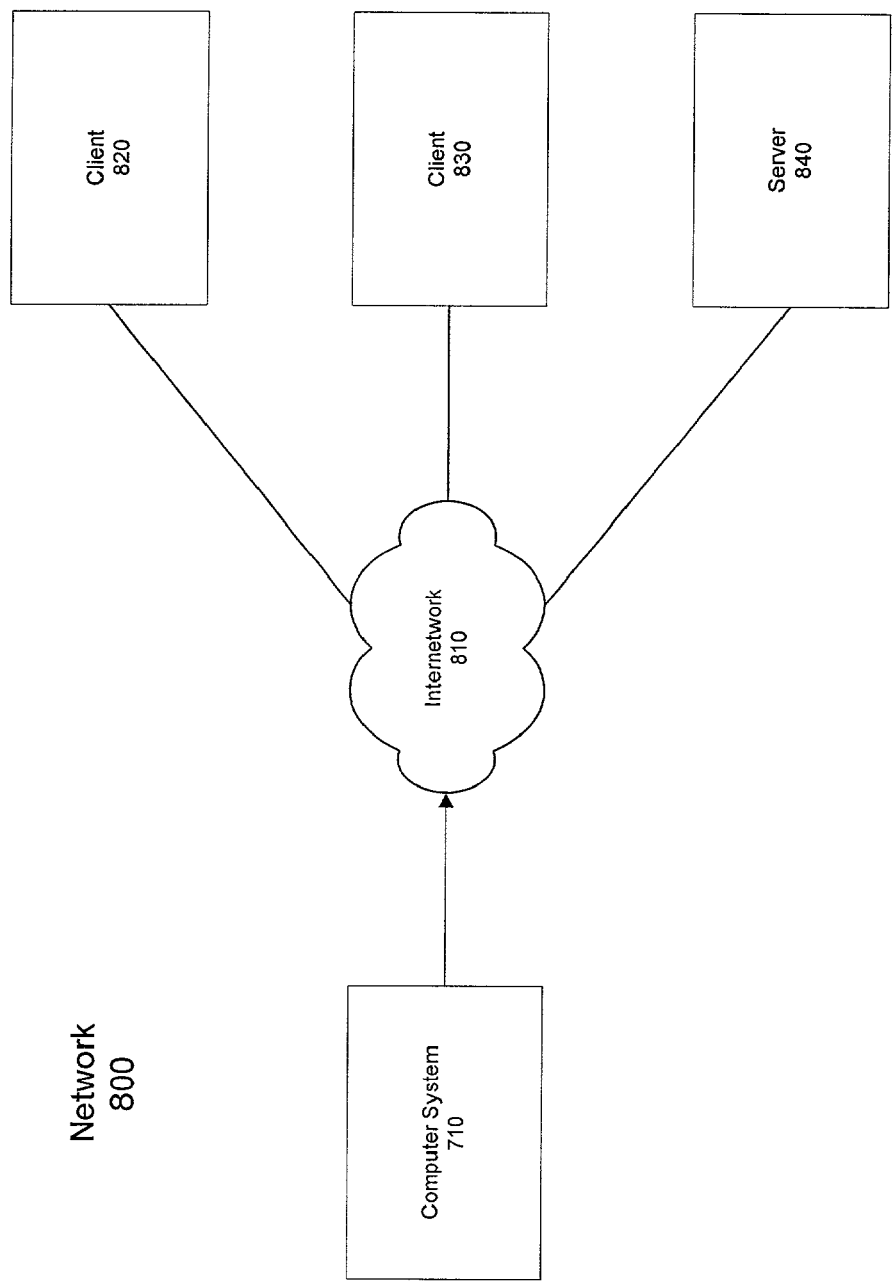
FIG. 8 is a block diagram illustrating the interconnection of the computer system of FIG. 7 to client and host systems.

FIG. 8 is a block diagram depicting a network 800 in which computer system 810 is coupled to an internetwork 810, which is coupled, in turn, to client systems 820 and 830, as well as a server 840. Internetwork 810 (e.g., the Internet) is also capable of coupling client systems 820 and 830, and server 840 to one another. With reference to computer system 810, modem 847, network interface 848 or some other method can be used to provide connectivity from computer system 810 to internetwork 810. Computer system 810, client system 820 and client system 830 are able to access information on server 840 using, for example, a web browser (not shown). Such a web browser allows computer system 810, as well as client systems 820 and 830, to access data on server 840 representing the pages of a website hosted on server 840. Protocols for exchanging data via the Internet are well known to those skilled in the art. Although FIG. 8 depicts the use of the Internet for exchanging data, the present invention is not limited to the Internet or any particular network-based environment.

Referring to FIGS. 6, 7 and 8, a browser running on computer system 810 employs a TCP/IP connection to pass a request to server 840, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources (e.g., fonts and colors).

Although the present invention has been described in connection with several embodiments, the invention is not intended to be limited to the specific forms set forth herein, but on the contrary, it is intended to cover such alternatives, modifications, and equivalents as can be reasonably included within the scope of the invention as defined by the appended claims.

What is claimed is:

1. A method of establishing an interface for a user system between a remote service that does not have a user interface and a remote application comprising:
   receiving a file by the application from the user system, wherein the file contains standardized interface data;
   sending the file from the application to the service;
   generating a return file by the service, wherein the return file contains standardized interface data;
   sending the return file to the application with a dynamic user interface specification containing explanatory error messages regarding graphics in the file;
   using the dynamic user interface specification to generate a graphical user interface by the application; and
   creating communication between the service that does not have a graphical user interface and the user by providing the return file and the explanatory error messages in the graphical user interface to the user system.

2. The method of establishing an interface between a service and an application of claim 1 wherein the return file is presented as a browser interface.

3. The method of establishing an interface between a service and an application of claim 1 further comprising:
   generating a dynamic user interface specification by the service;
   providing the dynamic user interface specification to application;
   generating a user interface response by the application; and
   providing the user interface response to the service.

4. The method of establishing an interface between a service and an application of claim 3 wherein the return file is presented as a browser interface.

5. The method of establishing an interface between a service and an application of claim 3 wherein the user system determines content of the user interface response.

6. The method of establishing an interface between a service and an application of claim 5 wherein the return file is presented as a browser interface.

7. The method of establishing an interface between a service and application of claim 3 wherein the user interface specification and user interface response are written in a markup language.

8. The method of establishing an interface between a service and application of claim 4 wherein the user interface specification and user interface response are written in a markup language.

9. The method of establishing an interface between a service and application of claim 5 wherein the user interface specification and user interface response are written in a markup language.

10. The method of establishing an interface between a service and application of claim 6 wherein the user interface specification and user interface response are written in a markup language.

11. A system for establishing an interface comprising of:
    a user system;
    an application that receives a file the user system, wherein the file contains standardized interface data; and
    a service that does not have a user interface configured to receives the file and generates a return file containing standardized interface data, sending the return file to the application and the user system;

wherein the return file contains a dynamic user interface specification with explanatory error messages regarding graphics in the file and the application is configured to use the dynamic UI specification to generate a graphical user interface for creating communication between the service that does not have a graphical user interface and the user by providing the return file and the explanatory error messages in the graphical user interface to the user system.

12. The system for establishing an interface of claim 11 wherein the return file is presented as a browser interface.

13. The system for establishing an interface of claim 11 further comprised of:
a dynamic user interface specification generated by the service, wherein the dynamic user interface specification is provided to the application; and
a user interface response generated by the application;
wherein the user interface response is provided to the service.

14. The system for establishing an interface of claim of claim 13 wherein the return file is presented as a browser interface.

15. The system for establishing an interface of claim of claim 13 wherein the user system determines content of the user interface response.

16. The system for establishing an interface of claim of claim 15 wherein the return file is presented as a browser interface.

17. The system for establishing an interface of claim of claim 13 wherein the user interface specification and user interface response are written in a markup language.

18. The system for establishing an interface of claim of claim 14 wherein the user interface specification and user interface response are written in a markup language.

19. The system for establishing an interface of claim of claim 15 wherein the user interface specification and user interface response are written in a markup language.

20. The system for establishing an interface of claim of claim 16 wherein the user interface specification and user interface response are written in a markup language.

21. A computer system comprising:
a processor; a computer;
computer readable medium coupled to the processor; and
computer code encoded in the computer readable medium, configured to cause the processor to:
receive a file by the application from a user system, wherein the file contains standardized interface data;
provide the file to a service that does not have a graphical user interface;
generate a return file by the service, wherein the return file contains standardized interface data;
provide the return file to the application; and
provide the return file to the user systems;
wherein the return file contains a dynamic user interface specification with explanatory error messages regarding graphics in the file and the application is configured to use the dynamic user interface specification to generate a graphical user interface for creating communication between the service that does not have a graphical user interface and the user by providing the return file and the explanatory error messages in the graphical user interface to the user system.

22. The computer system of claim 21 wherein the return file is presented as a browser interface.

23. The computer system of claim 21 wherein the processor further:

generates a dynamic user interface specification by the service;
provides the dynamic user interface specification to application;
generates a user interface response by the application; and
provides the user interface response to the service.

24. The computer system of claim 20 wherein the configuration file is written in an extensible markup language.

25. The computer system of claim 23 wherein the user system determines content of the user interface response.

26. The computer system of 25 wherein the return file is presented as a browser interface.

27. The computer system of claim 23 wherein the user interface specification and user interface response are written in a markup language.

28. The computer system of claim 24 wherein the user interface specification and user interface response are written in a markup language.

29. The computer system of claim 25 wherein the user interface specification and user interface response are written in a markup language.

30. The computer system of claim 26 wherein the user interface specification and user interface response are written in a markup language.

31. An apparatus for establishing an interface comprising:
means for receiving a file by the application from a user system, wherein the file contains standardized interface data;
means for providing the file to a service that does not have a graphical user interface;
means for generating a return file by the service, wherein the return file contains standardized interface data;
means for providing the return file to the application;
means for providing the return file to the user systems;
means for creating a dynamic user interface specification in the return file with explanatory error messages regarding graphics in the file; and
means for using the dynamic UI specification to generate a graphical user interface for creating communication between the service that does not have a graphical user interface and the user by providing the return file and the explanatory error messages in the graphical user interface to the user system.

32. The apparatus of claim 31 wherein the return file is presented as a browser interface.

33. The apparatus of claim 31 further comprising:
means for generating a dynamic user interface specification by the service;
means for providing the dynamic user interface specification to application;
means for generating a user interface response by the application; and
means for providing the user interface response to the service.

34. The apparatus of claim 33 wherein the return file is presented as a browser interface.

35. The apparatus of claim 33 wherein the user system determines content of the user interface response.

36. The apparatus of claim 35 wherein the return file is presented as a browser interface.

37. The apparatus of claim 33 wherein the user interface specification and user interface response are written in a markup language.

38. The apparatus of claim 34 wherein the user interface specification and user interface response are written in a markup language.

39. The apparatus of claim 35 wherein the user interface specification and user interface response are written in a markup language.

40. The apparatus of claim 36 wherein the user interface specification and user interface response are written in a markup language.

41. A computer program product encoded in computer readable media, the computer program product comprising:
   a first set of instructions, executable on a computer system, configured to receive a file by the application from a user system, wherein the file contains standardized interface data;
   a second set of instructions, executable on a computer system, configured to provide the file to a service that does not have a graphical user interface;
   a third set of instructions, executable on a computer system, configured to generate a return file by the service, wherein the return file contains standardized interface data;
   a fourth set of instructions, executable on a computer system, configured to provide the return file to the application; and
   a fifth set of instructions, executable on a computer system, configured to provide the return file to the user system;
   wherein the return file contains a dynamic user interface specification with explanatory error messages regarding graphics in the file and the application is configured to use the dynamic user interface specification to generate a graphical user interface for creating communication between the service that does not have a graphical user interface and the user by providing the return file and the explanatory error messages in the graphical user interface to the user system.

42. The computer program product of claim 41 wherein the return file is presented as a browser interface.

43. The computer program product of claim 41 further comprising:
   a fifth set of instructions, executable on a computer system, configured to generate a dynamic user interface specification by the service;
   a sixth set of instructions, executable on a computer system, configure to provide the dynamic user interface specification to application;
   a seventh set of instructions, executable on a computer system, configure to generate a user interface response by the application; and
   an eighth set of instructions, executable on a computer system, configure to provide the user interface response to the service.

44. The computer program product of claim 40 wherein the configuration file is written in an extensible markup language.

45. The computer program product of claim 43 wherein the user system determines content of the user interface response.

46. The computer program product of claim 45 wherein the return file is presented as a browser interface.

47. The computer program product of claim 43 wherein the user interface specification and user interface response are written in a markup language.

48. The computer program product of claim 44 wherein the user interface specification and user interface response are written in a markup language.

49. The computer program product of claim 45 wherein the user interface specification and user interface response are written in a markup language.

50. The computer program product of claim 46 wherein the user interface specification and user interface response are written in a markup language.

* * * * *

UNITED STATES PATENT AND TRADEMARK OFFICE
CERTIFICATE OF CORRECTION

PATENT NO.          : 7,016,962 B2                                        Page 1 of 1
APPLICATION NO. : 09/943717
DATED               : March 21, 2006
INVENTOR(S)         : William E. Hertling et al.

It is certified that error appears in the above-identified patent and that said Letters Patent is hereby corrected as shown below:

In column 9, line 32, delete "intemetwork" and insert -- internetwork --, therefor.

In column 10, line 65, in Claim 11, delete "receives" and insert -- receive --, therefor.

In column 10, line 65, in Claim 11, delete "generates" and insert -- generate --, therefor.

In column 11, line 4, in Claim 11, delete "UI" and insert -- user interface --, therefor.

In column 12, line 34, in Claim 31, delete "systems;" and insert -- system; --, therefor.

In column 12, line 39, in Claim 31, delete "UI" and insert -- user interface --, therefor.

Signed and Sealed this

Eleventh Day of August, 2009

David J. Kappos
*Director of the United States Patent and Trademark Office*